(12) United States Patent
Ko

(10) Patent No.: US 12,497,984 B2
(45) Date of Patent: Dec. 16, 2025

(54) CONNECTION KIT AND A HOLDER WITH THE CONNECTION KIT

(71) Applicant: Sap Products Limited, Guangdong (CN)

(72) Inventor: Yiu Fai Ko, Hong Kong (HK)

(73) Assignee: SAP PRODUCTS LIMITED, Guangdong (CN)

( * ) Notice: Subject to any disclaimer, the term of this patent is extended or adjusted under 35 U.S.C. 154(b) by 17 days.

(21) Appl. No.: 18/582,058

(22) Filed: Feb. 20, 2024

(65) Prior Publication Data
US 2024/0280128 A1 Aug. 22, 2024

(30) Foreign Application Priority Data
Feb. 20, 2023 (CN) .......................... 202320275578.2

(51) Int. Cl.
*F16B 7/04* (2006.01)
*F16M 11/08* (2006.01)

(52) U.S. Cl.
CPC ........... *F16B 7/0426* (2013.01); *F16M 11/08* (2013.01)

(58) Field of Classification Search
CPC .......... F16B 7/0426; F16B 7/042; F16B 7/04; F16B 7/00; F16B 7/0413; F16B 7/0446; F16B 7/14
See application file for complete search history.

(56) References Cited

U.S. PATENT DOCUMENTS

| | | | | |
|---|---|---|---|---|
| 3,072,425 A | * | 1/1963 | Nicholls | A47B 91/024 403/109.5 |
| 3,494,642 A | * | 2/1970 | Brown | F16B 7/02 403/345 |
| 3,876,320 A | * | 4/1975 | Phillipson | A01K 87/08 403/372 |
| 4,202,644 A | * | 5/1980 | Soussloff | F16D 1/094 279/47 |
| 4,345,851 A | * | 8/1982 | Soussloff | F16D 1/094 403/369 |
| 4,543,704 A | * | 10/1985 | Soussloff | F16D 1/094 29/458 |
| 4,600,334 A | * | 7/1986 | Soussloff | F16D 1/094 242/573 |

(Continued)

FOREIGN PATENT DOCUMENTS

CN 218441491 U 2/2023

*Primary Examiner* — Nkeisha Smith
(74) *Attorney, Agent, or Firm* — MUNCY, GEISSLER, OLDS & LOWE, P.C.

(57) ABSTRACT

A connection kit includes an inner sleeve and an outer sleeve. The inner sleeve includes a plurality of second gaps, a hollow connecting portion, a plurality of jaws respectively connected to one end of the connecting portion and a plurality of male threads respectively configured on the outer walls of the plurality of jaws. The outer sleeve includes a sleeve body and a female thread, and the plurality of the jaws and the plurality of second gaps are respectively configured in a separated manner. A holder includes the aforementioned connection kit, a connecting rod and a mounting connector sleeved outside the connecting portion. The plurality of jaws are circumferentially configured outside the connecting rod and able to be against the outer wall of the connecting rod. The structure of the connection kit is simple and has low production costs.

8 Claims, 4 Drawing Sheets

(56) References Cited

U.S. PATENT DOCUMENTS

| | | | | |
|---|---|---|---|---|
| 5,374,135 A * | 12/1994 | Folsom | .................. | F16D 1/094 |
| | | | | 403/362 |
| 5,474,403 A * | 12/1995 | Hetrich | .................. | F16D 1/094 |
| | | | | 403/370 |
| 5,695,297 A * | 12/1997 | Geib | ................ | F16D 1/094 |
| | | | | 403/369 |
| 6,142,698 A * | 11/2000 | Nutter | .................. | F16B 7/0426 |
| | | | | 403/109.1 |
| 6,361,243 B1 * | 3/2002 | Geib | ................ | F16B 2/065 |
| | | | | 403/370 |
| 6,761,274 B1 * | 7/2004 | Chen | .................... | A47B 45/00 |
| | | | | 403/109.1 |
| 8,117,787 B2 * | 2/2012 | Lee | ................ | E04G 25/061 |
| | | | | 403/109.5 |
| 8,272,604 B2 * | 9/2012 | Foster | .................. | F16M 11/28 |
| | | | | 248/371 |
| 8,506,200 B2 * | 8/2013 | Lu | .................. | F16B 7/1463 |
| | | | | 403/109.5 |
| 8,740,165 B2 * | 6/2014 | O'Kasick | ............. | F16M 11/10 |
| | | | | 248/276.1 |
| 10,145,402 B2 * | 12/2018 | Nakatani | ................. | F16B 7/149 |
| 10,385,637 B2 * | 8/2019 | Marr | ..................... | E21B 23/00 |
| 11,116,324 B2 * | 9/2021 | Leng | .................. | A47C 19/028 |
| 11,286,729 B2 * | 3/2022 | Mackay | .................. | E21B 19/16 |
| 11,940,093 B2 * | 3/2024 | Evitt | .................... | F16B 7/0473 |
| 2009/0162164 A1 * | 6/2009 | Bohl | ...................... | F16B 35/02 |
| | | | | 403/1 |
| 2009/0274511 A1 * | 11/2009 | Chen | .................... | G03B 17/561 |
| | | | | 403/109.5 |
| 2012/0133128 A1 * | 5/2012 | Bohl | ...................... | F16B 35/02 |
| | | | | 285/322 |
| 2013/0028656 A1 * | 1/2013 | Lu | ........................ | F16B 7/1463 |
| | | | | 403/109.1 |
| 2013/0092203 A1 * | 4/2013 | Zaltron | ................ | A63C 11/221 |
| | | | | 403/109.1 |
| 2015/0351531 A1 * | 12/2015 | Dalton | .............. | F16M 11/2078 |
| | | | | 248/558 |
| 2016/0120303 A1 * | 5/2016 | Constantino | ....... | F16M 11/2014 |
| | | | | 248/124.2 |
| 2019/0345717 A1 * | 11/2019 | Kang | ................... | F16B 7/0426 |
| 2019/0360514 A1 * | 11/2019 | Cheng | .................... | F16B 7/044 |
| 2020/0269329 A1 * | 8/2020 | Chang | ................ | B23B 31/1072 |
| 2025/0109640 A1 * | 4/2025 | Arsoski | ............. | E21B 17/1078 |

* cited by examiner

CONNECTION KIT AND A HOLDER WITH THE CONNECTION KIT

TECHNICAL FIELD

The present invention relates to the technical field of holders, particularly to a connection kit and a holder with the connection kit.

BACKGROUND ART

In recent years, with the rapid development of mobile payment and supporting devices of mobile payment, an increasing number of mobile payment device holders appear in people's production and daily life. The patent application entitled a rotatable holder with an application number of CN202222730775.7 discloses that: it comprises a base, a support rod running through the base, a hollow cavity arranged inside the support rod and running through the support rod along the length direction of the support rod, a wire hole arranged on the support rod and able to be communicated with the hollow cavity, a plurality of mounting joints 1 sleeved outside the support rod, respectively, a plurality of device components rotatably connected to the plurality of mounting joints 1, a mounting joint 2 sleeved outside the support rod, a fixing rod rotatably connected to the mounting joint 2, and a fixing plate articulated with the fixing rod. The connection method between the mounting joints and the support rod in this patent application is complex and requires the use of a screwdriver to fix the mounting joints to the support rod. The structure of the mounting joints is complicated. The installation step is tedious. The installation process is time-consuming and labor-intensive. Therefore, the defects are obvious and there is an urgent need to provide a solution.

SUMMARY OF THE INVENTION

In order to solve the above technical problem, an objective of the present invention is to provide a connection kit and a holder with the connection kit.

In order to achieve the foregoing objective, the present invention adopts the following technical solution:

A connection kit, wherein the connection kit comprises an inner sleeve and an outer sleeve sleeved outside the inner sleeve, the inner sleeve comprises a plurality of second gaps, a hollow connecting portion, a plurality of jaws connected respectively to one end of the connecting portion, and a plurality of male threads arranged respectively on the outer walls of the plurality of jaws; the outer sleeve comprises a sleeve body and a female thread arranged on the inner wall of the sleeve body, and the plurality of the jaws and the plurality of second gaps are arranged in a separated manner; the sleeve body can be sleeved outside the plurality of jaws; when the sleeve body is sleeved outside the plurality of jaws and moves towards the connecting portion, the female thread can be fit or engaged respectively with the teeth of the plurality of male threads, and the sleeve body can squeeze the plurality of jaws towards the center axis of the connecting portion to drive the plurality of jaws closer to each other.

Further, the inner sleeve further comprises a first gap running through the connecting portion along the length direction of the connecting portion; the first gap communicated with one of the second gaps.

Further, the nominal diameter of the male threads increases gradually along the direction approaching the connecting portion.

Further, the nominal diameter of the female thread decreases gradually along the direction approaching the connecting portion.

Further, the outer sleeve further comprises a plurality of contact portions formed by outward protrusion of the outer side wall of the sleeve body.

A holder with the connection kit, wherein the holder comprises the foregoing connection kit, a connecting rod running through the hollow space of the connecting portion, and a mounting joint sleeved outside the connecting portion and able to be coupled with the connecting portion; the plurality of jaws are circumferentially arranged outside the connecting rod and able to be against the outer side wall of the connecting rod.

Further, the mounting joint comprises a hoop sleeved outside the connecting portion, a rotating part articulated with the hoop, and a mounting part articulated with the rotating part.

Further, the inner sleeve further comprises two annular limit bumps at the two ends of the connecting portion, the two ends of the mounting joint can be respectively against the two limit bumps, and the height of the limit bump adjacent to the jaws is greater than the height of the other limit bump.

Further, the holder further comprises a fixing bracket arranged at the bottom end of the connecting rod.

Further, the connecting rod is hollow, the holder further comprises a first wire hole arranged on the fixing bracket and a plurality of second wire holes running through the connecting rod, and the first wire hole and the second wire holes are respectively communicated with the hollow space of the connecting rod.

The beneficial effects of the present invention: The connection kit of the present invention features a simple structure and low production cost. By quickly connecting the connecting rod and the mounting joint with the connection kit, the quick installation of an external device onto the connecting rod is facilitated without using any additional auxiliary tools. This simplifies the connecting steps of the mounting joint and the external device to the connecting rod, and saves installation time and efficiency of the external device. The present invention shows strong practicability and high utilization.

DESCRIPTION OF REFERENCE SIGNS 1. inner sleeve; 2. outer sleeve; 3. second gap; 4. connecting portion; 5. jaw; 6. male thread; 7. female thread; 8. sleeve body; 9. connecting rod; 10. mounting joint; 11. first gap; 12. limit bump; 13. contact portion; 14. hoop; 15. rotating part; 16. mounting part; 17. fixing bracket; 18. first wire hole; 19. second wire hole.

DETAILED DESCRIPTION

For easy understanding by those skilled in the art, the present invention is further described in conjunction with embodiments and accompanying drawings. The content mentioned in the embodiment is not a limitation to the present invention.

Figure 1:
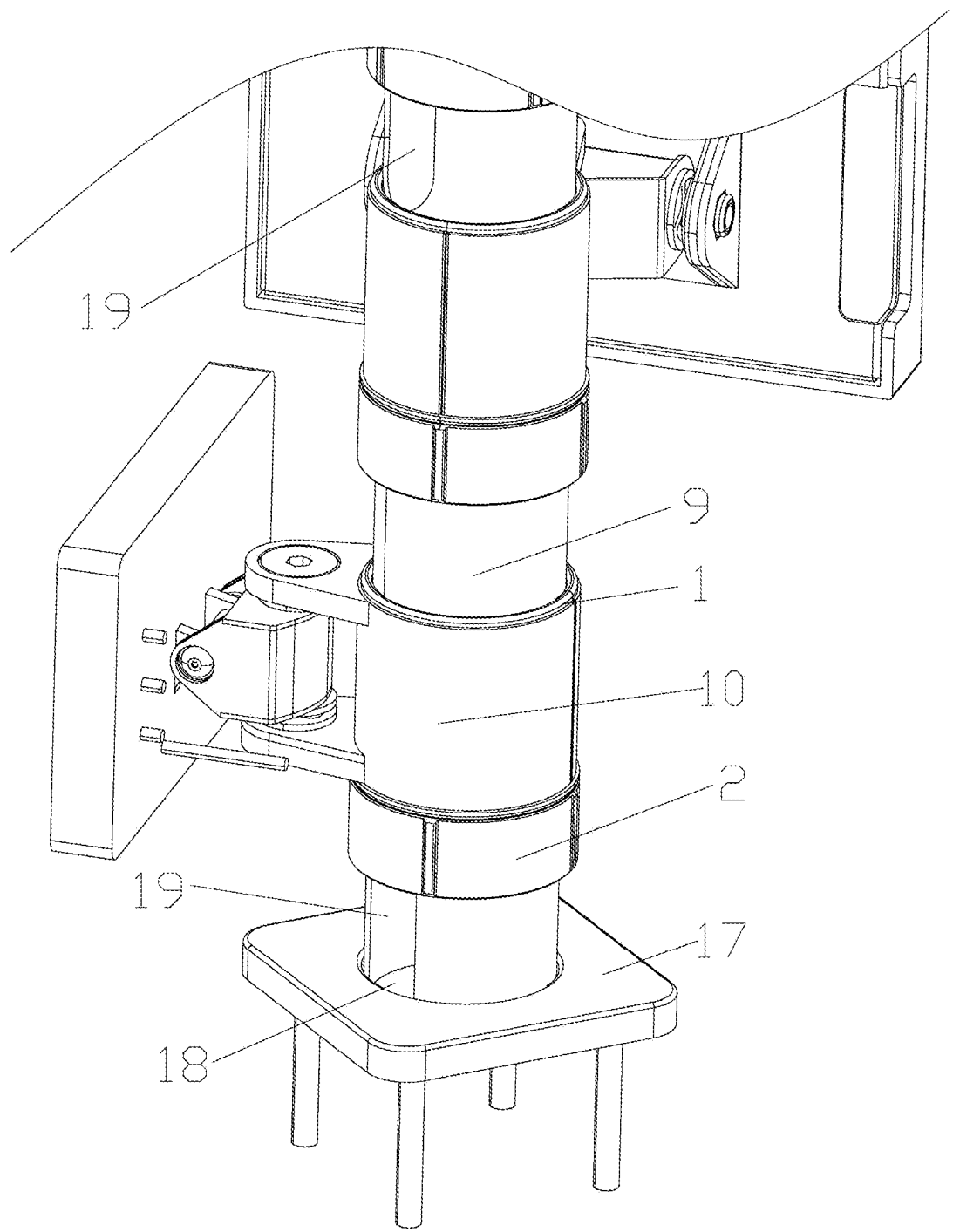
FIG. 1 is a three-dimensional structural schematic view of the present invention.
Figure 2:
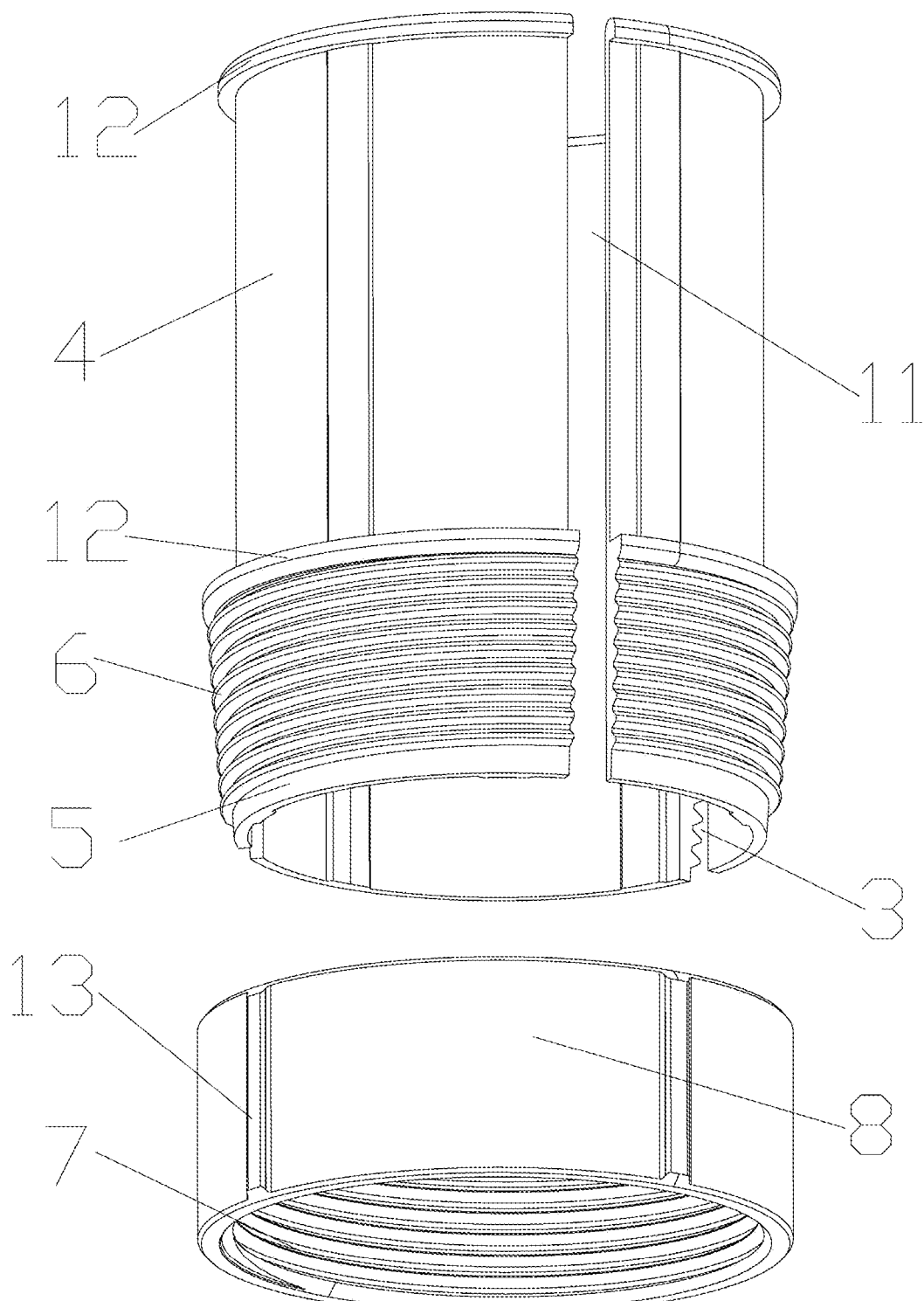
FIG. 2 is an exploded structural schematic view of a connection kit of the present invention.
Figure 3:
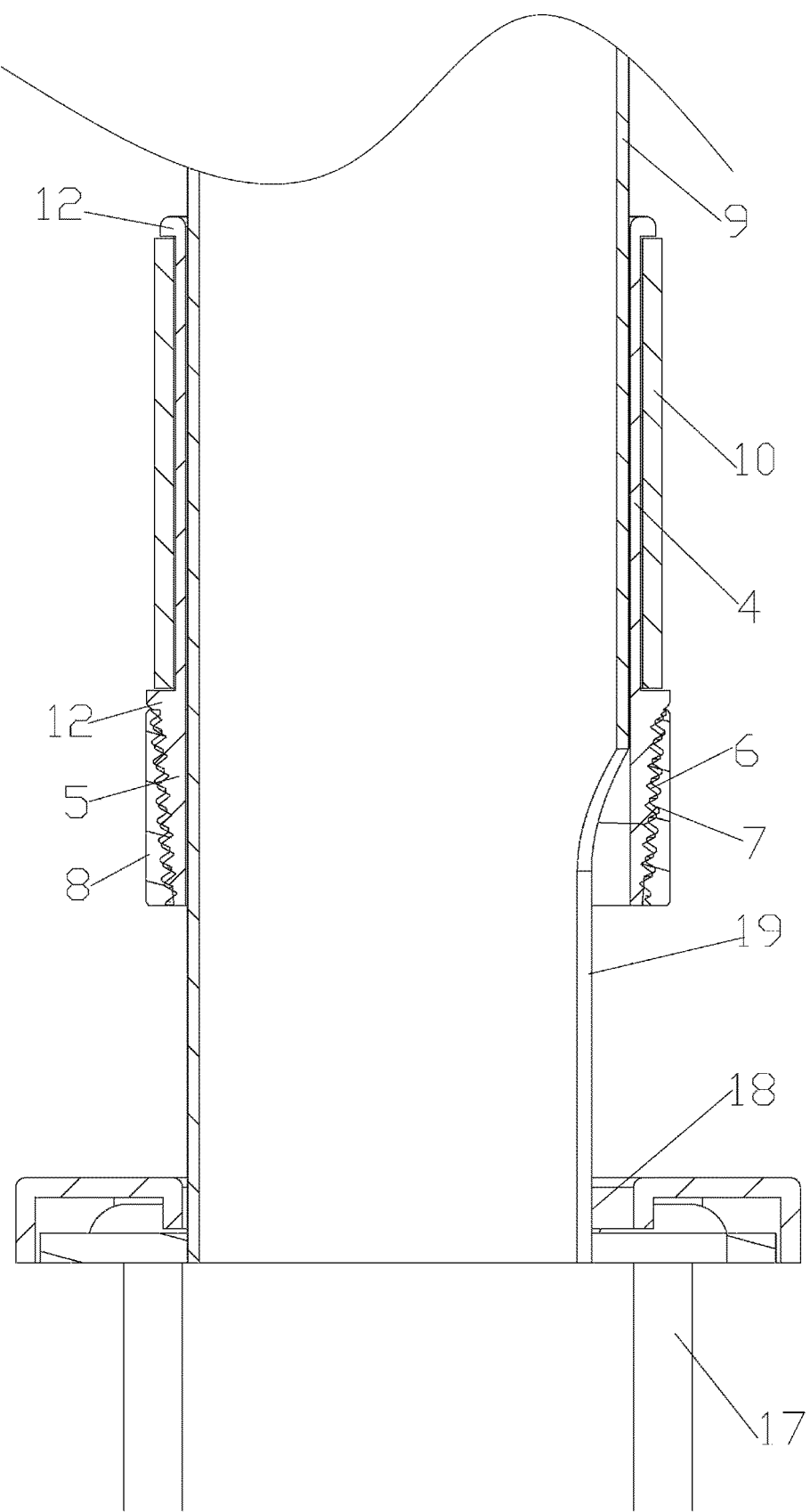
FIG. 3 is a partial section view of the present invention.
Figure 4:
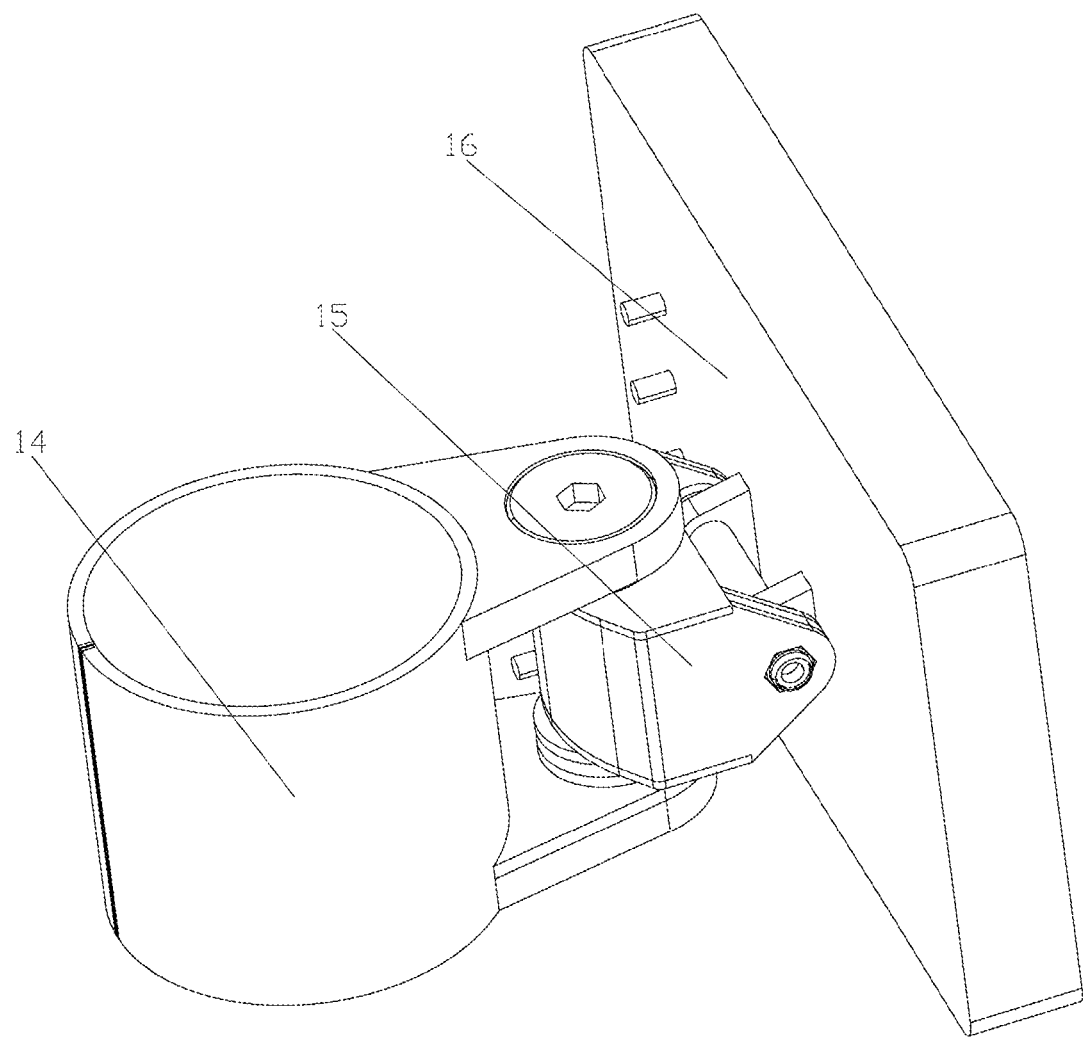
FIG. 4 is a three-dimensional structural schematic view of a mounting joint of the present invention.

As shown in FIG. 1 to FIG. 4, the present invention provides a connection kit, wherein the connection kit comprises an inner sleeve 1 and an outer sleeve 2 sleeved outside the inner sleeve 1, the inner sleeve 1 comprises a plurality of second gaps 3, a hollow connecting portion 4, a plurality of jaws 5 respectively connected to one end of the connecting portion 4 and a plurality of male threads 6 respectively arranged on the outer side walls of the plurality of jaws 5; the outer sleeve 2 comprises a sleeve body 8 and a female thread 7 arranged on the inner wall of the sleeve body 8, and the plurality of the jaws 5 and the plurality of second gaps 3 are arranged in a separated manner; the sleeve body 8 can be sleeved outside the plurality of jaws 5; when the sleeve body 8 is sleeved outside the plurality of jaws 5 and moves or rotates towards the connecting portion 4, the female thread 7 can be respectively fitted or engaged with the teeth of the plurality of male threads 6, and the sleeve body 8 can squeeze the plurality of jaws 5 towards the central axis of the connecting portion 4 to drive the plurality of jaws 5 closer to each other, thereby causing the inner diameter of the hollow area enclosed by the inner side walls of the plurality of jaws 5 to decrease.

A holder with the connection kit, wherein the holder comprises the foregoing connection kit, a connecting rod 9 running through the hollow space of the connecting portion 4, and a mounting joint 10 sleeved outside the connecting portion 4 and able to be coupled with the connecting portion 4, and the plurality of jaws 5 are circumferentially arranged outside the connecting rod 9 respectively and able to be against the outer side wall of the connecting rod 9. Specifically, the structural schematic top view of the connecting portion 4 is in a ring shape; and the plurality of jaws 5 and the second gaps 3 are arranged in a ring array along the central axis of the connecting portion 4. The mounting joint 10 can be used for fixing or mounting an external device. In the actual mounting process, the connecting rod 9 runs through the hollow space of the connecting portion 4 and the hollow area enclosed by the plurality of jaws 5 in turn to adjust the connecting portion 4 to an appropriate position or height on the connecting rod 9. At this time, the plurality of jaws 5 are in a state of elastic expansion. Then one end of the connecting rod 9 was ran through the sleeve body 8 so that the sleeve body 8 is sleeved outside the plurality of jaws 5 and rotates relative to the jaws 5 in a direction close to the connecting portion 4, causing the female thread 7 to be respectively engaged with the plurality of male threads 6 and causing the plurality of jaws 5 to be close to each other and the plurality of second gaps 3 to be reduced gradually, thereby making the inner diameter of the hollow area decrease until the plurality of jaws 5 are tightly against the outer side wall of the connecting rod 9 respectively. At this time the jaws 5 are in a state of elastic constraint or contraction and work together to buckle or clamp the connecting rod 9 inside the hollow area, thereby achieving quick connection or clamping between the connection kit and the connecting rod 9. Then the mounting joint 10 is sleeved outside the connecting portion 4 and buckled with the connecting portion 4, thereby completing the assembly of the holder, and lastly, an external device is mounted on the mounting joint 10. The structure of the connection kit provided by the present invention is simple and low production cost. By quickly connecting the connecting rod 9 and the mounting joint 10 with the connection kit, this facilitates the quick installation of an external device onto the connecting rod 9 without using any additional auxiliary tools. This simplifies the connecting steps of the mounting joint 10 and the external device to the connecting rod 9, and saves the installation time and efficiency of the external device. In addition, the connection kits and the mounting joints 10 both can be multiple and correspond to each other one by one. A connection kit is fixed to the connecting rod 9, then another connection kit is fixed to the connecting rod 9, and the plurality of connection kits are fixed to the connecting rod 9 in sequence. The positions where the plurality of connection kits are buckled on the connecting rod 9 can be adjusted according to the actual needs, thereby improving the practicability and utilization of the present invention.

Further, the inner sleeve 1 further comprises a first gap 11 running through the connecting portion 4 along the length direction of the connecting portion 4 and communicated with one second gap 3.

Specifically, the inner sleeve 1 further comprises two annular limit bumps 12 at the two ends of the connecting portion 4. The two ends of the mounting joint 10 can be against the two limit bumps 12, respectively. The height of the limit bump 12 adjacent to the jaws 5 is greater than the height of the other limit bump 12. In the process of actual use, when it is necessary to fix the connection kit to the connecting rod 9, the connecting rod 9 is placed upright, and the connecting portion 4 is sleeved on the connecting rod 9 in a way that the jaws 5 is located below the connecting portion 4. When the sleeve body 8 drives the plurality of jaws 5 gradually close to each other, the plurality of jaws 5 can drive the end of the connecting portion 4 connected to the jaws 5 to contract towards the hollow space of the connecting portion 4. At the same time, the first gap 11 adjacent to one end of the jaw 5 is reduced or contracted, and the inner wall of the connecting portion 4 adjacent to one end of the jaw 5 is against the connecting rod 9, further improving the stability of the connection between the connection kit and the connecting rod 9. When it is necessary to sleeve the mounting joint 10 onto the outside of the connecting portion 4, the end of the connecting portion 4 away from the jaw 5 can be manually squeezed towards the hollow space of the connecting portion 4. At the same time, the first gap 11 away from one end of the jaw 5 is reduced or contracted so that the mounting joint 10 is sleeved outside the connecting portion 4 after passing through the limit bump 12 away from one end of the jaw 5. After the mounting joint 10 is sleeved outside the connecting portion 4, the limitation to the connecting portion 4 is released, and the two limit bumps 12 are respectively buckled at the two ends of the mounting joint 10 to limit the axial position where the mounting joint 10 is mounted on the connecting portion 4. As the height of the limit bump 12 adjacent to the jaws 5 is higher, even if the diameter of the connecting portion 4 is reduced or the first gap 11 is reduced, the limit bump 12 adjacent to the jaws 5 still can be against the mounting joint 10 continuously, thereby avoiding the mounting joint 10 slipping out from the bottom of the connecting portion 4 after contraction of the first gap 11, and facilitating the stable connection between the mounting joint 10 and the connecting portion 4.

Further, the nominal diameter of the male threads 6 increases gradually along the direction approaching the connecting portion 4.

Specifically, the nominal diameter of the female thread 7 decreases gradually along the direction approaching the connecting portion 4, and the projection view of the male threads 6 is conical. In the process of actual use, the sleeve body 8 is sleeved outside the plurality of jaws 5 and rotates towards the connecting portion 4 relative to the jaws 5. In the process of engagement between the female thread 7 and the male threads 6, the male threads 6 squeeze the jaws 5 towards the central axis of the connecting portion 4, thereby achieving the jaws 5 to be tightly against the connecting rod 9. The connection and installation of the jaws 5 and the connecting rod 9 is convenient.

Further, the outer sleeve 2 further comprises contact portions 13 formed by outward protrusion of the outer wall of the sleeve body 8. The number of the contact portions 13 is set to be multiple.

A plurality of the contact portions 13 are additionally provided to avoid slipping when the sleeve body 8 is rotated by human hands relative to the jaws 5 and facilitate the quick assembly between the connection kit and the connecting rod 9.

Further, the mounting joint 10 comprises a hoop 14 sleeved outside the connecting portion 4, a rotating part 15 articulated with the hoop 14, and a mounting part 16 articulated with the rotating part 15. The mounting part 16 is used for mounting an external device.

In the process of actual use, the articulated shaft of the rotating part 15 and the mounting part 16 is perpendicular to the articulated shaft of the hoop 14 and the rotating part 15, so that the mounting part 16 can drive the external device to rotate in universal directions relative to the hoop 14. This facilitates multi-angle rotation of the external device and the use or display of the external device.

Further, the holder further comprises a fixing bracket 17 arranged at the bottom end of the connecting rod 9.

In the process of actual use, the connecting rod 9 is fixed on a desktop or a bottom surface by means of the fixing bracket 17, improving the stability of the present invention in the use process.

Further, the connecting rod 9 is hollow. The holder further comprises a first wire hole 18 arranged on the fixing bracket 17 and a plurality of second wire holes 19 running through the connecting rod 9, and the first wire hole 18 and the second wire holes 19 are respectively communicated with the hollow space of the connecting rod 9.

In the process of actual use, the external device can be a tablet computer, a printer, a card reader, an anti-theft display or/and an NFC quick-pay card reader light device. A power cord or signal cable of the external device runs through the second wire holes 19 and enters the hollow space of the connecting rod 9, then passes through the first wire holes 18 to leave the hollow space of the connecting rod 9 and is electrically connected to an external power supply or communicates with a control center. The first wire hole 18, the second wire holes 19 and the hollow space of the connecting rod 9 sort and tidy up the power cord or signal cable of the external device, avoiding issues of tangling and disorder of the power cord or signal cable. Additionally, they play a role in protecting and shielding the power cord or signal cable, improving the safety of the present invention, and making the appearance of the present invention even better.

All technical features in this embodiment can be combined freely according to actual needs.

The above embodiment is a preferred solution for implementation of the present invention. Besides, the present invention can also be implemented in other ways. Without departing from the conception of this technical solution, all apparent replacements are within the scope of protection of the present invention.

The invention claimed is:

1. A holder with a connection kit, comprising:
   the connection kit, wherein the connection kit comprises an inner sleeve and an outer sleeve sleeved outside the inner sleeve, the inner sleeve comprising a plurality of second gaps, a hollow connecting portion, a plurality of jaws respectively connected to one end of the connecting portion and a plurality of male threads respectively arranged on outer walls of the plurality of jaws; the outer sleeve comprising a sleeve body and a female thread arranged on an inner wall of the sleeve body, and the plurality of the jaws and the plurality of second gaps being arranged in a separated manner; the sleeve body being able to be sleeved outside the plurality of jaws; when the sleeve body is sleeved outside the plurality of jaws and moves towards the connecting portion, the female thread being able to be respectively engaged with a teeth of the plurality of male threads, and the sleeve body being able to squeeze the plurality of jaws towards a central axis of the connecting portion to drive the plurality of jaws closer to each other;
   a connecting rod running through a hollow space of the connecting portion; and
   a mounting joint sleeved outside the connecting portion and able to be coupled with the connecting portion,
   wherein the plurality of jaws are circumferentially arranged outside the connecting rod and able to be against an outer wall of the connecting rod, and
   wherein the inner sleeve further comprises two annular limit bumps at two ends of the connecting portion, two ends of the mounting joint respectively being able to be against the two limit bumps, and the height of the limit bump adjacent to the jaws being greater than the height of an other limit bump.

2. The holder with the connection kit according to claim 1, wherein the inner sleeve further comprises a first gap running through the connecting portion along the length direction of the connecting portion and communicated with one of the second gaps.

3. The holder with the connection kit according to claim 1, wherein a nominal diameter of the male threads increases gradually along a direction approaching the connecting portion.

4. The holder with the connection kit according to claim 3, wherein a nominal diameter of the female thread decreases gradually along a direction approaching the connecting portion.

5. The holder with the connection kit according to claim 1, wherein the outer sleeve further comprises contact portions formed by outward protrusion of an outer side wall of the sleeve body; the number of the contact portions is set to be multiple.

6. The holder with the connection kit according to claim 1, wherein the mounting joint comprises a hoop sleeved outside the connecting portion, a rotating part articulated with the hoop, and a mounting part articulated with the rotating part.

7. The holder with the connection kit according to claim 1, wherein the holder further comprises a fixing bracket arranged at a bottom end of the connecting rod.

8. The holder with the connection kit according to claim 7, wherein the connecting rod is hollow, the holder further comprising a first wire hole arranged on the fixing bracket and a plurality of second wire holes running through the connecting rod, and the first wire hole and the second wire holes being communicated with a hollow space of the connecting rod.

* * * * *